United States Patent
Lee et al.

(10) Patent No.: US 7,792,201 B2
(45) Date of Patent: Sep. 7, 2010

(54) APPARATUS AND METHOD FOR DETERMINING PILOT PATTERN IN A BROADBAND WIRELESS ACCESS COMMUNICATION SYSTEM

(75) Inventors: Jong-Hyeuk Lee, Anyang-si (KR); Myeon-Kyun Cho, Seongnam-si (KR); Won-Kyu Paik, Seoul (KR); Jong-Soo Seo, Seoul (KR)

(73) Assignees: Samsung Electronics Co., Ltd. (KR); Industry-Academic Cooperation Foundation, Yonsei University (KR)

( * ) Notice: Subject to any disclaimer, the term of this patent is extended or adjusted under 35 U.S.C. 154(b) by 903 days.

(21) Appl. No.: 11/647,949

(22) Filed: Dec. 29, 2006

(65) Prior Publication Data

US 2007/0153931 A1   Jul. 5, 2007

(30) Foreign Application Priority Data

Dec. 29, 2005   (KR) .................... 10-2005-0132859

(51) Int. Cl.
*H04K 1/10* (2006.01)
(52) U.S. Cl. .................... 375/260; 375/355; 375/344; 375/131; 375/346; 370/208; 370/203
(58) Field of Classification Search .................. 375/260, 375/355, 344, 131, 346; 370/208, 203
See application file for complete search history.

(56) References Cited

U.S. PATENT DOCUMENTS

| | | | | |
|---|---|---|---|---|
| 5,589,763 A * | 12/1996 | Burns | .................... | 324/76.15 |
| 6,385,264 B1 * | 5/2002 | Terasawa et al. | .......... | 375/371 |
| 6,567,374 B1 * | 5/2003 | Bohnke et al. | .......... | 370/203 |
| 6,725,058 B2 * | 4/2004 | Rinne et al. | ............. | 455/553.1 |
| 7,058,002 B1 * | 6/2006 | Kumagai et al. | ........... | 370/203 |
| 7,236,554 B2 * | 6/2007 | Gupta | .................... | 375/355 |
| 7,239,659 B2 * | 7/2007 | Thomas et al. | ............ | 375/141 |
| 7,280,467 B2 * | 10/2007 | Smee et al. | ............... | 370/208 |
| 7,283,498 B2 * | 10/2007 | Ro et al. | .................... | 370/333 |
| 7,388,541 B1 * | 6/2008 | Yang | .................... | 342/464 |
| 7,436,758 B2 * | 10/2008 | Suh et al. | .................... | 370/203 |
| 7,450,559 B2 * | 11/2008 | Schotten et al. | ........... | 370/348 |
| 7,460,466 B2 * | 12/2008 | Lee et al. | .................... | 370/208 |

(Continued)

FOREIGN PATENT DOCUMENTS

JP   2004-135120   4/2004

OTHER PUBLICATIONS

Santiago Zazo et al., "Efficient Pilot Patterns for Channel Estimation in OFDM Systems over HF Channels", VTC'99.

*Primary Examiner*—Chieh M Fan
*Assistant Examiner*—Santiago Garcia
(74) *Attorney, Agent, or Firm*—The Farrell Law Firm, LLP

(57) ABSTRACT

An apparatus and method for determining a pilot pattern in a Broadband Wireless Access (BWA) communication system are provided. In the pilot pattern determining method, an Orthogonal Frequency Division Multiplexing (OFDM) demodulator generates frequency-domain data by fast-Fourier-transform (FFT)-processing a received signal. A pilot pattern decider calculates a coherence bandwidth and a coherence time using subcarrier values received from the OFDM demodulator, and selects one of a plurality of pilot patterns according to the ratio of the coherence bandwidth to the coherence time.

20 Claims, 6 Drawing Sheets

U.S. PATENT DOCUMENTS

| | | | |
|---|---|---|---|
| 7,468,943 B2 * | 12/2008 | Gu et al. | 370/203 |
| 7,555,047 B2 * | 6/2009 | Zhang | 375/260 |
| 7,558,354 B2 * | 7/2009 | Peake et al. | 375/363 |
| 7,577,087 B2 * | 8/2009 | Palin | 370/210 |
| 2002/0044591 A1 * | 4/2002 | Lee et al. | 375/130 |
| 2004/0131007 A1 * | 7/2004 | Smee et al. | 370/208 |
| 2005/0002369 A1 * | 1/2005 | Ro et al. | 370/342 |
| 2005/0094550 A1 * | 5/2005 | Huh et al. | 370/203 |
| 2005/0201475 A1 * | 9/2005 | Alcouffe | 375/260 |
| 2005/0226140 A1 * | 10/2005 | Zhuang et al. | 370/203 |
| 2005/0226141 A1 * | 10/2005 | Ro et al. | 370/203 |
| 2006/0008037 A1 * | 1/2006 | Chang et al. | 375/346 |
| 2006/0062317 A1 * | 3/2006 | Chang et al. | 375/260 |
| 2006/0067205 A1 * | 3/2006 | Jung et al. | 370/203 |
| 2006/0078059 A1 * | 4/2006 | Ok et al. | 375/260 |
| 2006/0146856 A1 * | 7/2006 | Jung et al. | 370/431 |
| 2006/0146867 A1 * | 7/2006 | Lee et al. | 370/465 |
| 2006/0146948 A1 * | 7/2006 | Park et al. | 375/260 |
| 2006/0172713 A1 * | 8/2006 | Suzuki et al. | 455/103 |
| 2006/0172716 A1 * | 8/2006 | Yoshii et al. | 455/226.1 |
| 2006/0198295 A1 * | 9/2006 | Georg Gerlach | 370/208 |
| 2006/0215778 A1 * | 9/2006 | Murthy et al. | 375/260 |
| 2006/0285479 A1 * | 12/2006 | Han et al. | 370/203 |
| 2007/0041404 A1 * | 2/2007 | Palanki et al. | 370/479 |
| 2007/0070944 A1 * | 3/2007 | Rinne et al. | 370/329 |
| 2007/0153931 A1 * | 7/2007 | Lee et al. | 375/260 |
| 2007/0263743 A1 * | 11/2007 | Lee et al. | 375/267 |
| 2008/0137718 A1 * | 6/2008 | Cha et al. | 375/146 |
| 2008/0192868 A1 * | 8/2008 | Budianu et al. | 375/344 |
| 2008/0305818 A1 * | 12/2008 | Ko et al. | 455/509 |
| 2009/0147688 A1 * | 6/2009 | Matsumoto et al. | 370/242 |

* cited by examiner

APPARATUS AND METHOD FOR DETERMINING PILOT PATTERN IN A BROADBAND WIRELESS ACCESS COMMUNICATION SYSTEM

PRIORITY

This application claims priority under 35 U.S.C. §119 to an application filed in the Korean Intellectual Property Office on Dec. 29, 2005 and assigned Serial No. 2005-132859, the contents of which are incorporated herein by reference.

BACKGROUND OF THE INVENTION

1. Field of the Invention

The present invention relates generally to a Broadband Wireless Access (BWA) communication system, and in particular, to an apparatus and method for adaptively changing a pilot pattern according to a link in an Orthogonal Frequency Division Multiplexing (OFDM) communication system.

2. Description of the Related Art

Although there are many wireless communication technologies proposed as candidates for high-speed mobile communications, OFDM is considered the most prominent future-generation wireless communication technology. It is expected that OFDM will be adopted for most wireless communication applications by the year 2010. OFDM has been adopted as a standard for an Institute of Electrical and Electronics Engineers (IEEE) 802.16 Wireless Metropolitan Area Network (WMAN) categorized into the $3.5^{th}$ Generation (3.5G) technology.

In a conventional OFDM communication system, a transmitter simultaneously sends pilot subcarrier signals to a receiver with transmission of data subcarrier signals. The receiver performs synchronization acquisition, channel estimation, and Base Station (BS) identification using the pilot subcarrier signals. A transmission rule for sending the pilot subcarrier signals is known as "pilot pattern".

The pilot pattern is determined in consideration of coherence bandwidth and coherence time. The coherence bandwidth is the maximum bandwidth over which a channel is relatively constant or non-distorting in the frequency domain, and the coherence time is the maximum time for which the channel is relatively constant in the time domain. Since the channel can be assumed to be constant over the coherence bandwidth for the coherence time, one pilot signal suffices for synchronization acquisition, channel estimation and BS identification.

Conventionally, a fixed pilot pattern is used and existing adaptive pilot pattern techniques focus on optimization of pilot power and throughput. A technique for adaptively changing a pilot pattern according to a link status (e.g. coherence bandwidth and coherence time) is yet to be developed.

Radio channels are said to be a wide range of random channels and it is difficult to always ensure optimum performance over these random channels with the conventional fixed pilot pattern. Assuming that a pilot pattern is created using the same number of pilots, a layout of pilot subcarriers affects performance according to the link status, which in turn directly influences channel estimation performance. That is, the channel estimation performance may increase according to the pilot pattern. Since the channel estimation performance has an influence on Bit Error Rate (BER), it is important to select a pilot pattern that minimizes channel estimation errors.

SUMMARY OF THE INVENTION

An object of the present invention is to substantially solve at least the above problems and/or disadvantages and to provide at least the advantages below. Accordingly, an object of the present invention is to provide an apparatus and method for adaptively changing a pilot pattern according to a link in a BWA communication system.

An object of the present invention is to provide an apparatus and method for selecting a pilot pattern that minimizes channel estimation errors in a BWA communication system.

A further object of the present invention is to provide an apparatus and method for adaptively changing an uplink pilot pattern according to an uplink in a BWA communication system.

Another object of the present invention is to provide an apparatus and method for selecting a pilot pattern based on the Mean Square Error (MSE) of frequency-domain data in a BWA communication system.

According to the present invention, in an apparatus for determining a pilot pattern in a BWA communication system, an OFDM demodulator generates frequency-domain data by fast-Fourier-transform (FFT)-processing a received signal. A pilot pattern decider calculates a coherence bandwidth and a coherence time using subcarrier values received from the OFDM demodulator, and selects one of a plurality of pilot patterns according to the ratio of the coherence bandwidth to the coherence time.

According to the present invention, in a method of determining a pilot pattern in a BWA communication system, subcarrier values are generated by FFT-processing a received signal. A coherence bandwidth and a coherence time are calculated using the subcarrier values. One of a plurality of pilot patterns is selected according to the ratio of the coherence bandwidth to the coherence time.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail for the sake of clarity and conciseness.

Figure 1:
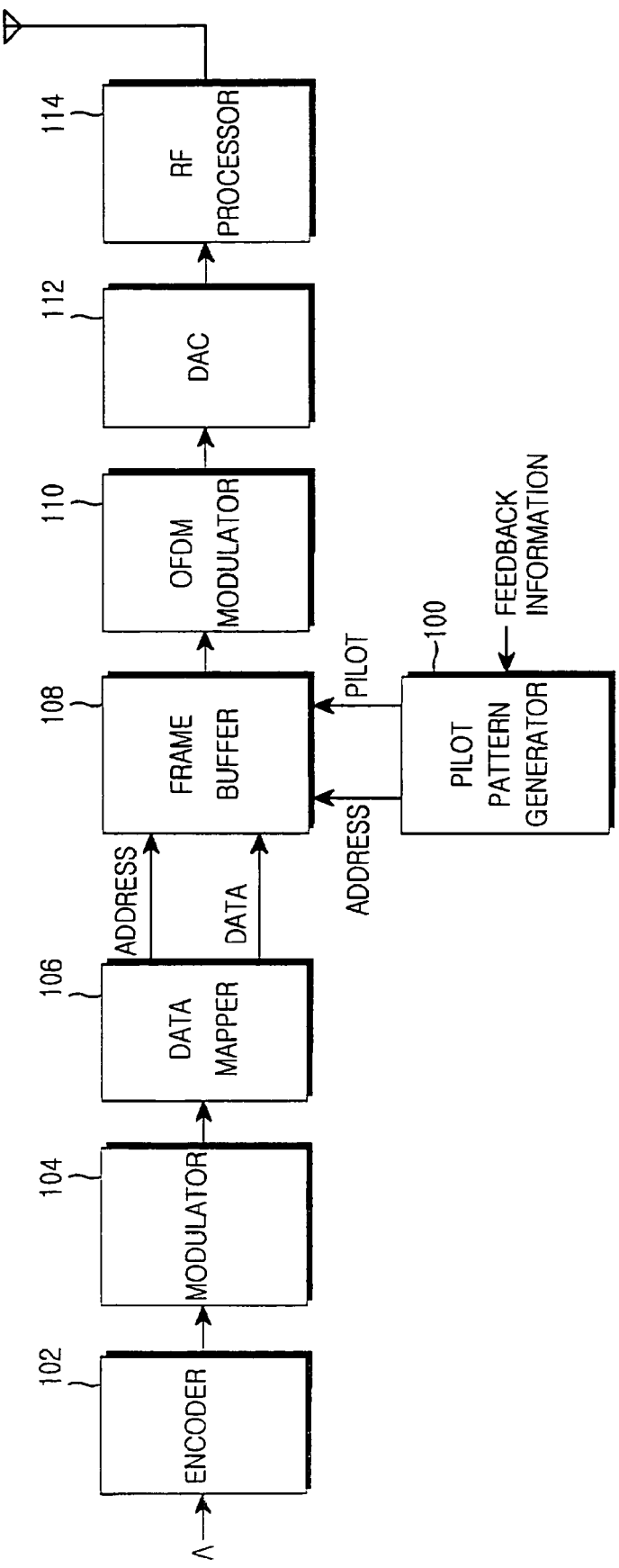
FIG. 1 is a block diagram of a transmitter in a BWA communication system according to the present invention.

FIG. 1 is a block diagram of a transmitter in a BWA communication system according to present invention. The transmitter is a relative concept, in that it is a Mobile Station (MS) on the uplink and a BS on the downlink.

Referring to FIG. 1, the transmitter includes a pilot pattern generator 100, an encoder 102, a modulator 104, a data mapper 106, a frame buffer 108, an OFDM modulator 110, a Digital-to-Analog Converter (DAC) 112 and a Radio Frequency (RF) processor 114.

In operation, the encoder 102 encodes an input information bit stream at a coding rate and outputs the resulting coded bits or code symbols. With the number of the information bits being denoted by k and the coding rate being denoted by R, the number of the code symbols is k/R. The encoder 102 may be a convolutional encoder, a turbo encoder or a Low Density Parity Check (LDPC) encoder.

The modulator 104 generates complex symbols by mapping the coded symbols to signal points according to a modulation scheme or modulation level. For example, the modulation scheme is one of Binary Phase Shift Keying (BPSK), Quadrature Phase Shift Keying (QPSK), 8-ary Phase Shift Keying (8PSK), 16-ary Quadrature Amplitude Modulation (16QAM) and 64QAM. One bit (s=1) is mapped to one signal point (i.e. complex symbol) in BPSK, two bits (s=2) are mapped to one signal point in QPSK, three bits (s=3) are mapped to one signal point in 8PSK, four bits (s=4) are mapped to one signal point in 16QAM and six bits (s=6) are mapped to one signal point in 64QAM.

The data mapper 106 maps the complex symbols to subcarriers according to a control signal received from a higher layer and provides the mapped complex symbols to memory addresses in the frame buffer 108 of an actual frame size.

The pilot pattern generator 100 selects a pilot pattern according to feedback information (i.e. pilot pattern selection information) received from a receiver and outputs pilot symbols to corresponding addresses of the frame buffer 108 according to the selected pilot pattern. For example, if a frame size is 64×64 and one frame delivers 64 pilot symbols, a 16×4 first pilot pattern and a 4×16 pilot pattern are available. According to the first pilot pattern, the pilot symbols are mapped equidistantly at an interval of 16 on the frequency axis and at an interval of 4 on the time axis. The second pilot pattern indicates that the pilot symbols are mapped equidistantly at an interval of 4 on the frequency axis and at an interval of 16 on the time axis. The first pilot pattern is viable when a coherence bandwidth is greater than a coherence time, while the second pilot pattern is used when the coherence time is greater than the coherence bandwidth.

The frame buffer 108 is a buffer for ordering the complex symbols in an actual transmission order, prior to input to the OFDM modulator 110. The frame buffer 108 sequentially outputs the buffered complex symbols based on timing synchronization on an OFDM symbol basis.

The OFDM modulator 110 converts the complex symbols received from the frame buffer 107 to time-domain sample data by Inverse-Fast-Fourier-Transform (IFFT)-processing the complex symbols, and adds a copy of a last part of the sample data to the sample data, thereby generating an OFDM symbol.

The DAC 112 converts the sample data to an analog signal. The RF processor 114, including a filter and a front-end unit, processes the analog signal to an RF signal and ends the RF signal on a radio channel through a transmit antenna. The transmitted signal experiences a multi-path channel, is added with noise, and then arrives at a receive antenna of the receiver.

Figure 2:
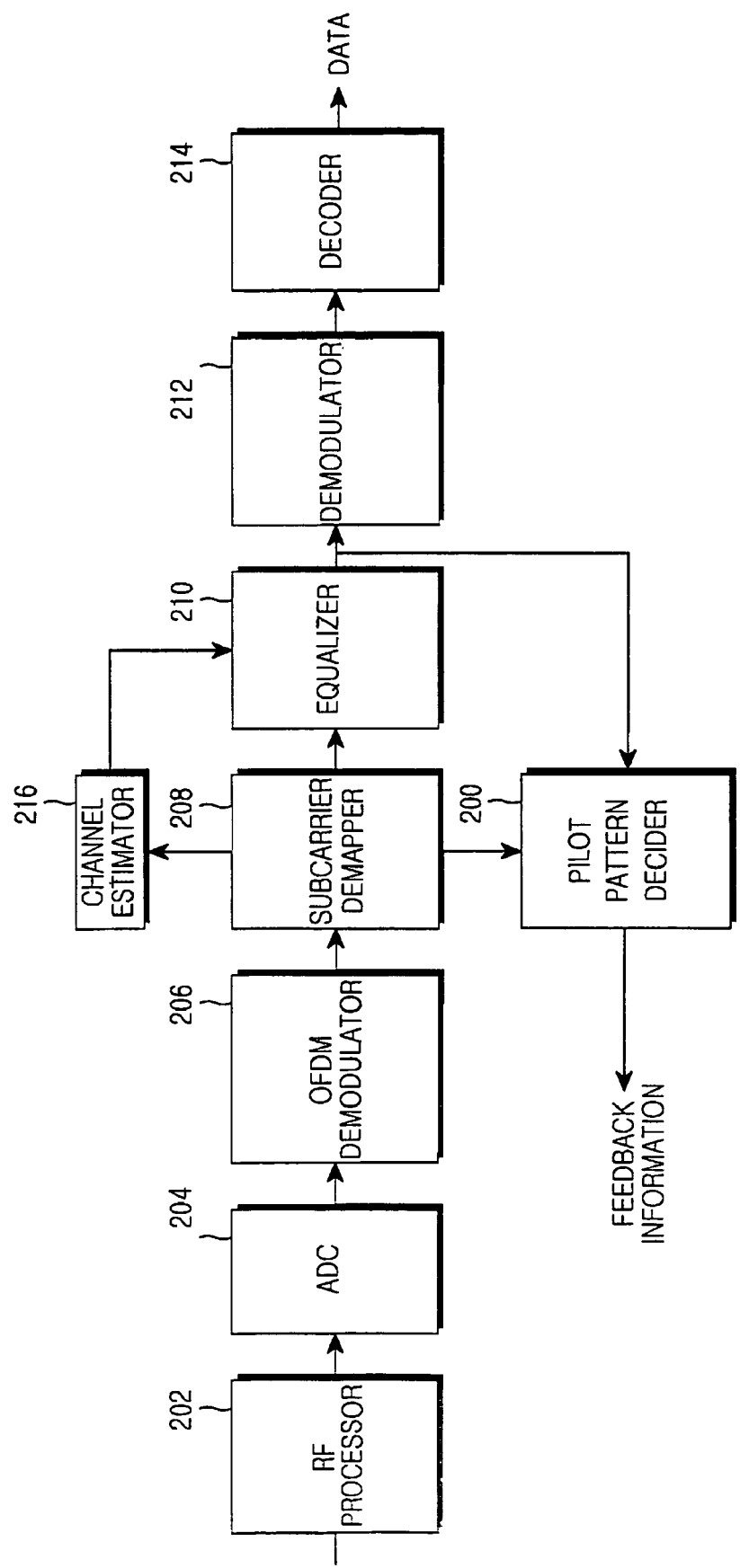
FIG. 2 is a block diagram of a receiver in the BWA communication system according to the present invention.

FIG. 2 is a block diagram of a receiver in the BWA communication system according to the present invention. The receiver is a relative concept, in that the BS is the receiver on the uplink and the MS is the receiver on the downlink.

Referring to FIG. 2, the receiver includes a pilot pattern decider 200, an RF processor 202, an Analog-to-Digital Converter (ADC) 204, an OFDM demodulator 206, a subcarrier demapper 208, an equalizer 210, a demodulator 212, a decoder 214 and a channel estimator 216.

In operation, the RF processor 202, including a front-end unit and a filter, downconverts an RF signal received on a radio channel to a baseband signal. The ADC 204 converts the analog baseband signal received form the RF processor 202 to a digital signal.

The OFDM demodulator 206 removes a Cyclic Prefix (CP) from the digital data and generates frequency-domain data by FFT-processing the CP-removed data.

The subcarrier demapper 208 extracts data symbols from the OFDM-demodulated data received from the OFDM demodulator 206 and outputs the data symbols to the equalizer 210. It also extracts pilot symbols at pilot subcarrier positions and provides the extracted pilot symbols to the channel estimator 216.

The channel estimator 216 performs channel estimation using the pilot symbols. The equalizer 210 channel-compensates the received data symbols based on channel estimate values received from the channel estimator 216, that is, compensates for noise created on the radio channel.

The demodulator 212 demodulates the symbols received form the equalizer in accordance with the modulation scheme used in the transmitter and outputs the resulting coded data. The decoder 214 decodes the coded data corresponding to the coding method used in the transmitter, thereby recovering the original information data.

The pilot pattern decider 200 calculates the mean square error (MSE) of each of the channel-compensated subcarrier values received from the equalizer 210 and calculates a coherence bandwidth and a coherence time by accumulating the MSEs on the frequency and time axes. The pilot pattern decider 200 selects a pilot pattern by comparing the ratio of the coherence bandwidth to the coherence time with a threshold value and generates feedback information indicating the selected pilot pattern. The feedback information is sent to the transmitter on a feedback channel.

If the coherence bandwidth is greater than the coherence time, a pilot pattern is selected which maps pilot symbols densely along the time axis. If the coherence time is greater than the coherence bandwidth, a pilot pattern is selected which maps pilot symbols densely along the frequency axis.

Figure 3:
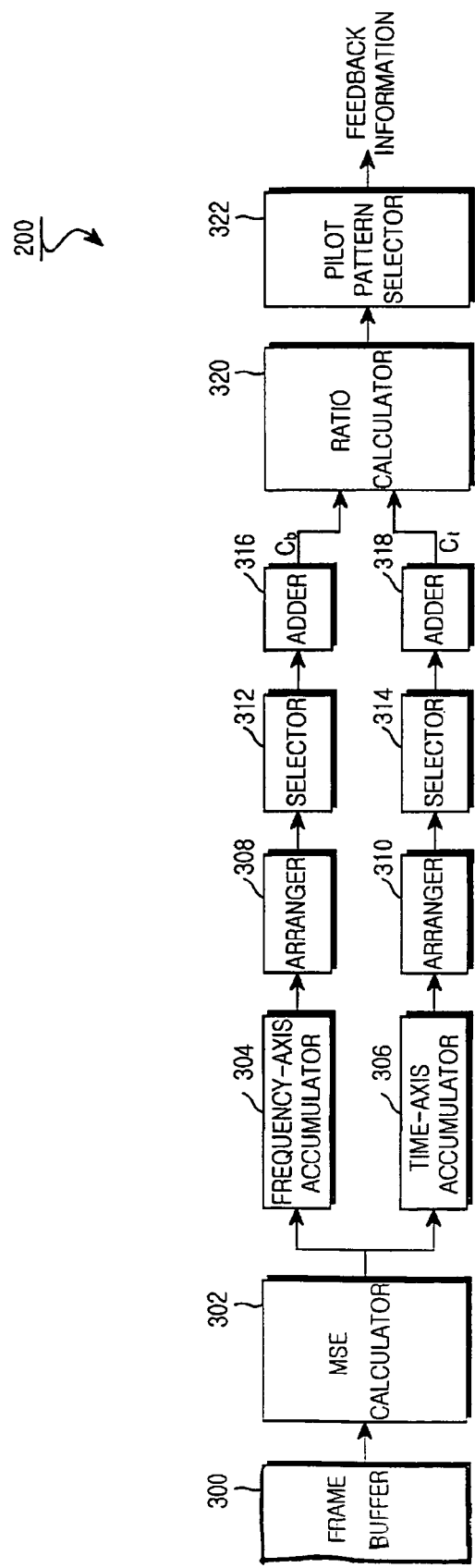
FIG. 3 is a detailed block diagram of a pilot pattern decider illustrated in FIG. 2.

FIG. 3 is a detailed block diagram of the pilot pattern decider 200 illustrated in FIG. 2.

Referring to FIG. 3, the pilot pattern decider 200 includes a frame buffer 300, a mean square error (MSE) calculator 302, a frequency-axis accumulator 304, a time-axis accumulator 306, a first arranger 308, a second arranger 310, a first selector 312, a second selector 314, a first adder 316, a second adder 318, a ratio calculator 320 and a pilot pattern selector 322.

In operation, the frame buffer 300 buffers the frequency-domain frame data received form the equalizer 210. A 64×64 frame size (40964 subcarrier values) is assumed. The MSE calculator 302 calculates the MSEs of the subcarrier values (received complex symbols) received from the frame buffer 300. The MSEs can be calculated in any one of known methods and a description of the MSE calculation will not be provided herein.

The frequency-axis accumulator 304 accumulates the calculated 64×64 MSE values along the frequency axis or column by column, thereby creating 64 accumulation values. The time-axis accumulator 306 accumulates the calculated 64×64 MSE values along the time axis or row by row, thereby creating 64 accumulation values.

The first arranger 308 orders the 64 accumulation values received from the frequency-axis accumulator 304 in a descending order, and the second arranger 310 orders the 64 accumulation values received from the time-axis accumulator 306 in a descending order.

The first selector 312 selects a number of (e.g. 32) accumulation values among the ordered accumulation values from the first arranger, starting from the highest accumulation value, and the second selector 314 selects a number of (e.g. 32) accumulation values among the ordered accumulation values from the second arranger 310, starting from the highest accumulation value.

The first adder 316 generates a value $C_b$ indicating the coherence bandwidth by summing the accumulation values received the first selector 312, and the second adder 318 generates a value $C_t$ indicating the coherence time by summing the accumulation values received from the second selector 314.

The ratio calculator 320 calculates the ratio R of the coherence bandwidth to the coherence time by dividing $C_b$ by $C_t$ and then calculating the Log 10 of the division result.

The pilot pattern selector 322 compares the ratio R with a threshold value, selects a pilot pattern based on the comparison adaptively according to the link, and generates feedback information indicating the selected pilot pattern.

The ratio R may be inaccurate when too a small number of MSEs are in an entire frame. In this case, the sum of $C_b$ and $C_t$ is compared with a threshold value. If the sum is less than the threshold value, a pilot pattern is selected based on the average of previous $C_b$ to $C_t$ ratio.

Figure 4:
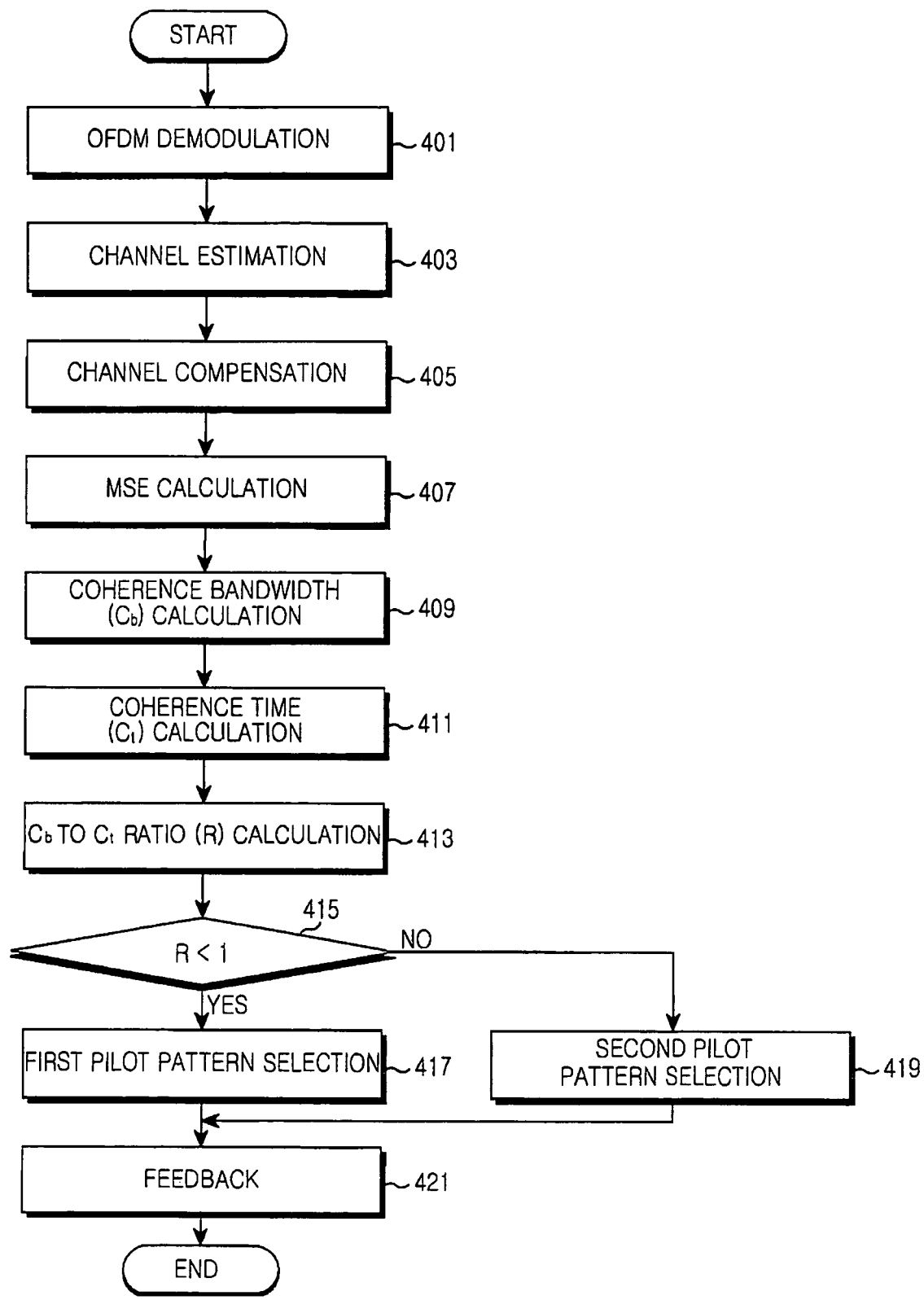
FIG. 4 is a flowchart illustrating an operation for feeding back a pilot pattern in the receiver in the BWA communication system according to the present invention.

FIG. 4 is a flowchart illustrating an operation for feeding back a pilot pattern in the receiver in the BWA communication system according to the present invention.

Referring to FIG. 4, the receiver downconverts an RF signal received through an antenna to a baseband signal and OFDM-demodulates the baseband signal, thus acquiring frequency-domain data in step 401.

In step 403, the receiver extracts symbols at subcarrier positions (i.e. pilot symbols) from the frequency-domain data and performs channel estimation using the extracted symbols.

The receiver channel-compensates the frequency-domain data using channel estimate values in step 405 and calculates the MSEs of the channel-compensated subcarrier values (complex symbols) in step 407.

In step 409, the receiver accumulates the MSE values along the frequency axis, selects a number of accumulation values in a descending order, and sums them. The sum is the coherence bandwidth $C_b$. In step 411, the receiver accumulates the MSE values along the time axis, selects a number of accumulation values in a descending order, and sums them. The sum is the coherence time $C_t$.

The receiver calculates the ratio R of the coherence bandwidth to the coherence time by dividing $C_b$ by $C_t$ and calculating the Log 10 of the division result in step 413.

In step 415, the receiver compares the ratio R with 1. If R is less than 1, which implies that the coherence bandwidth is greater than the coherence time, the receiver selects a first pilot pattern in which pilot symbols are mapped more densely along the time axis in step 417.

If R is equal to or greater than 1, which implies that the coherence time is greater than the coherence bandwidth, the receiver selects a second pilot pattern in which pilot symbols are mapped more densely along the frequency axis in step 419.

After selecting the pilot pattern, the receiver generates feedback information indicating the selected pilot pattern and sends the feedback information on the feedback channel to the transmitter in step 421.

Figure 5:
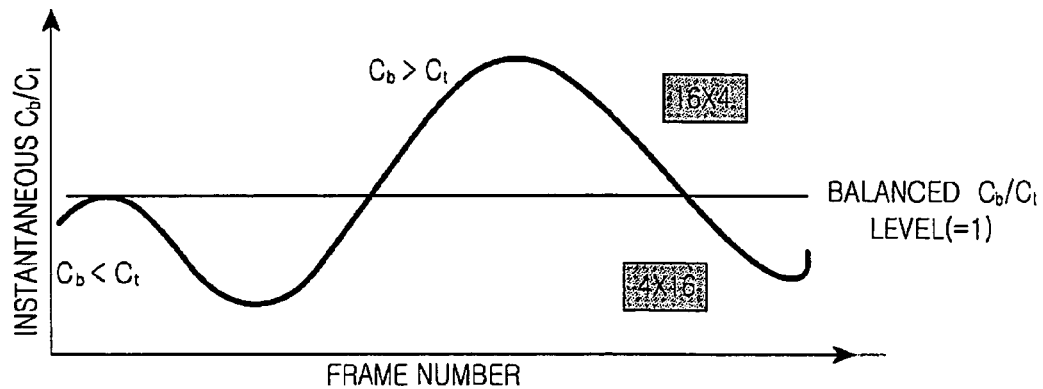
FIG. 5 is a graph illustrating a first embodiment of a pilot pattern selection method according to the present invention.

FIG. 5 is a graph illustrating a first embodiment of a pilot pattern selection method according to the present invention. A 64×64 frame size and mapping of 64 pilot symbols per frame are assumed.

Referring to FIG. 5, a pilot pattern is selected in which the ratio R ($C_b/C_t$) converges to 1. If the coherence bandwidth is greater than the coherence time, the 16×4 first pilot pattern is selected in which pilot symbols are mapped at an interval of 16 along the frequency axis and at an interval of 4 along the time axis. If the coherence time is greater than the coherence bandwidth, the 4×16 second pilot pattern is selected in which pilot symbols are mapped at an interval of 4 along the frequency axis and at an interval of 16 along the time axis. In this manner, although the same number of pilot symbols are allocated to each frame, the layout of the pilot symbols is adapted to the link status.

Figure 6:
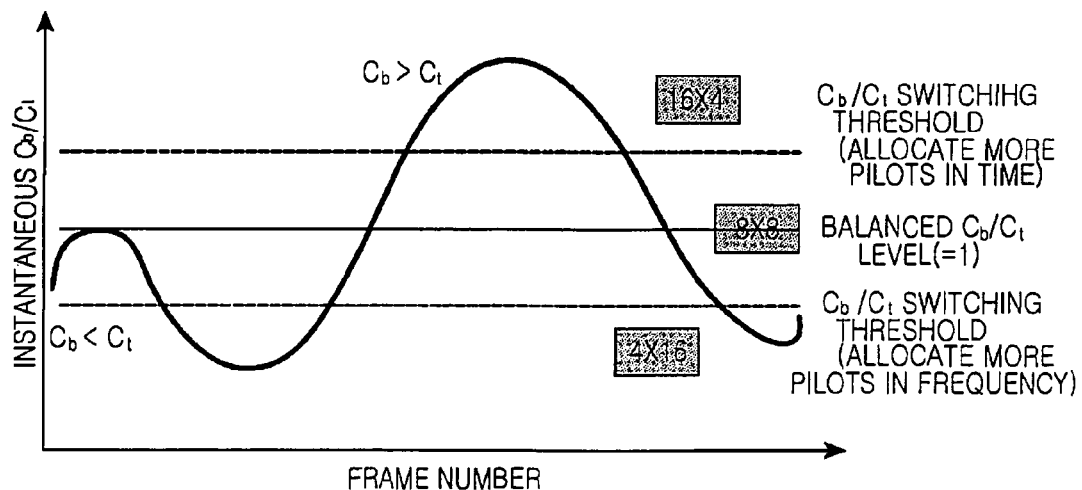
FIG. 6 is a graph illustrating a second embodiment of a pilot pattern selection method according to the present invention.

FIG. 6 is a graph illustrating a second embodiment of a pilot pattern selection method according to the present invention.

Referring to FIG. 6, two thresholds are set for pilot pattern switching. If the ratio R ($C_b/C_t$) is greater than a first threshold, the 16×4 first pilot pattern is selected. If the ratio R is between the first and second thresholds, an 8×8 third pilot pattern is selected in which pilot symbols are mapped at an interval of 8 along the frequency axis and at an interval of 8 along the time axis. If the ratio R is less than the second threshold, the 4×16 second pilot pattern is selected. This pilot pattern selection method leads to robust operation against factors such as sudden channel changes or frame delay by use of a smooth transitional pattern. Preferably, the first and second thresholds are empirically obtained.

A simulation was performed to verify the performance of the present invention, under the following parameters listed in Table 1.

TABLE 1

| | |
|---|---|
| Carrier frequency | 5 GHz |
| FFT size | 1024 (16 users) |
| Bandwidth | 40 MHz |
| Symbol length | 25.6 μs |
| Guard interval | 3.2 μs (T/8) |
| Max delay spread | 5 ns, 10 ns |
| Mobile velocity | 5 km/h, 160 km/h |
| Modulation | QPSK |
| Channel estimator | Bilinear interpolation |
| Pilot patterns used | 3 (4 × 16, 8 × 8, 16 × 4) |
| Pilot density | <2% |
| User frame size | 64 × 64 |
| Channels | AWGN, 3-ray indoor |

Figure 7:
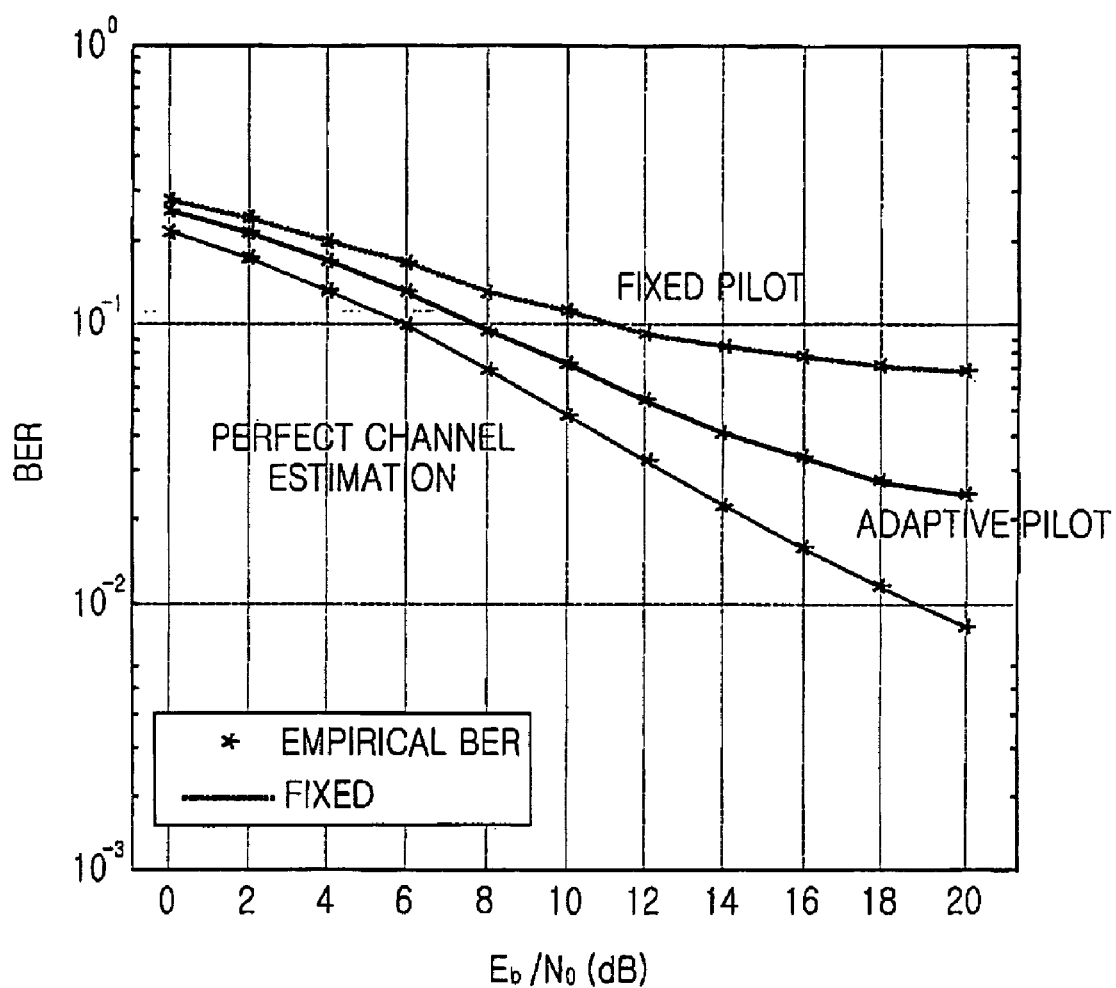
FIG. 7 is a graph comparing the present invention using an adaptive pilot pattern with a conventional technology using a fixed pilot pattern in terms of performance.

FIG. 7 is a graph comparing the present invention using an adaptive pilot pattern with a conventional technology using a fixed pilot pattern in terms of performance.

Referring to FIG. 7, the horizontal axis represents received signal strength ($E_b/N_o$) and the vertical axis represents Bit Error Rate (BER). As noted from the graph, the adaptive pilot pattern method of the present invention outperforms the conventional fixed pilot pattern method.

As described above, the present invention advantageously reduces channel estimation errors by adaptively mapping the same number of pilot symbols in a different layout according to the link status. The minimization of channel estimation errors leads to the increase of data BER. Also, the present invention reduces signaling overhead by switching a pilot pattern on a frame-by-frame basis.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for determining a pilot pattern in a wireless communication system, comprising:
    an orthogonal frequency division multiplexing (OFDM) demodulator for generating frequency-domain data by fast-Fourier-transform (FFT)-processing a received signal; and
    a pilot pattern decider for calculating a coherence bandwidth and a coherence time using subcarrier values received from the OFDM demodulator, and selecting one of a plurality of pilot patterns according to a ratio of the coherence bandwidth to the coherence time,
    wherein the pilot pattern decider comprises:
    a mean square error (MSE) calculator for calculating the MSE of each of the subcarrier values;
    a first calculator for calculating the coherence bandwidth by accumulation the MSEs along a frequency axis;
    a second calculator for calculating the coherence time by accumulation the MSEs along a time axis; and
    a pattern selector for selecting the pilot pattern according to the ratio of coherence bandwidth to the coherence time.

2. The apparatus of claim 1, further comprising an equalizer for channel-compensating the subcarrier values received from the OFDM demodulator and providing the channel-compensated subcarrier values to the pilot pattern decider.

3. The apparatus of claim 1, wherein the first calculator comprises:
    a frequency-axis accumulator for accumulating the MSEs along the frequency axis;
    a selector for selecting a number of accumulation values among the accumulations values generated in the frequency-axis accumulator in a descending order; and
    an adder for calculating the coherence bandwidth by summing the selected accumulation values.

4. The apparatus of claim 1, wherein the second calculator comprises:
    a time-axis accumulator for accumulating the MSEs along the time axis;
    a selector for selecting a number of accumulation values among the accumulations values generated in the time-axis accumulator in a descending order; and
    an adder for calculating the coherence time by summing the selected accumulation values.

5. The apparatus of claim 1, wherein the pattern selector selects a pilot pattern in which the ratio of the coherence bandwidth to the coherence time converges to 1.

6. The apparatus of claim 1, wherein the pattern selector selects a pilot pattern that allocates more pilot symbols to the time axis than to the frequency axis if the coherence bandwidth is greater than the coherence time.

7. The apparatus of claim 1, wherein the pattern selector selects a pilot pattern that allocates more pilot symbols to the frequency axis than to the time axis if the coherence time is greater than the coherence bandwidth.

8. The apparatus of claim 1, wherein the pattern selector selects a pilot pattern based on an average of previous coherence bandwidth to coherence time ratio if the sum of the coherence bandwidth and the coherence time is less than a threshold.

9. The apparatus of claim 1, wherein information indicating the selected pilot pattern is sent to a transmitter on a feedback channel.

10. The apparatus of claim 1, wherein the pilot pattern decider selects a pilot pattern on a frame-by-frame basis.

11. A method of determining a pilot pattern in a wireless communication system, comprising the steps of:
    generating subcarrier values by fast-Fourier-transform (FFT)-processing a received signal;
    calculating a coherence bandwidth and a coherence time using the subcarrier values; and
    selecting one of a plurality of pilot patterns according to a ratio of the coherence bandwidth to the coherence time,
    wherein calculating the coherence bandwidth and the coherence time further comprises:
    calculating a mean square error (MSE) of each of the subcarrier values;
    calculating the coherence bandwidth by accumulating the MSEs along a frequency axis; and
    calculating the coherence time by accumulating the MSEs along a time axis.

12. The method of claim 11, further comprising channel-compensating the subcarrier values and providing the channel-compensated subcarrier values for use in calculating the coherence bandwidth and the coherence time.

13. The method of claim 11, wherein calculating the coherence bandwidth further comprises:
    accumulating the MSEs along the frequency axis;
    selecting a number of accumulation values among the accumulations values in a descending order; and
    calculating the coherence bandwidth by summing the selected accumulation values.

14. The method of claim 11, wherein calculating the coherence time further comprises:
    accumulating the MSEs along the time axis;
    selecting a number of accumulation values among the accumulations values in a descending order; and
    calculating the coherence time by summing the selected accumulation values.

15. The method of claim 11, wherein selecting the one of the plurality of pilot patterns further comprises:
    calculating the ratio of the coherence bandwidth to the coherence time; and
    selecting a pilot pattern in which the ratio of the coherence bandwidth to the coherence time converges to 1.

16. The method of claim 11, wherein selecting the one of the plurality of pilot patterns further comprises:
    calculating a ratio of the coherence bandwidth to the coherence time;
    selecting a pilot pattern that allocates more pilot symbols to the time axis than to the frequency axis, if the ratio is greater than a first threshold; and selecting a pilot pattern that allocates more pilot symbols to the frequency axis than to the time axis, if the ratio is less than a second threshold.

17. The method of claim 16, wherein selecting the one of the plurality of pilot patterns further comprises selecting a pilot pattern that allocates pilot symbols equally along the frequency axis and the time axis, if the ratio is greater than the second threshold and less than the first threshold.

18. The method of claim 16, wherein selecting the one of the plurality of pilot patterns further comprises selecting a pilot pattern based on the average of previous coherence bandwidth to coherence time ratio, if the sum of the coherence bandwidth and the coherence time is less than a threshold.

19. The method of claim 11, further comprising sending information indicating the selected pilot pattern to a transmitter on a feedback channel.

20. The method of claim 11, wherein selecting the one of the plurality of pilot patterns further comprises selecting a pilot pattern on a frame-by-frame basis.

* * * * *